Oct. 27, 1964    R. L. UPHOFF ETAL    3,153,928
ULTRASONIC MEASUREMENT INSTRUMENT
Filed June 22, 1962    2 Sheets-Sheet 1
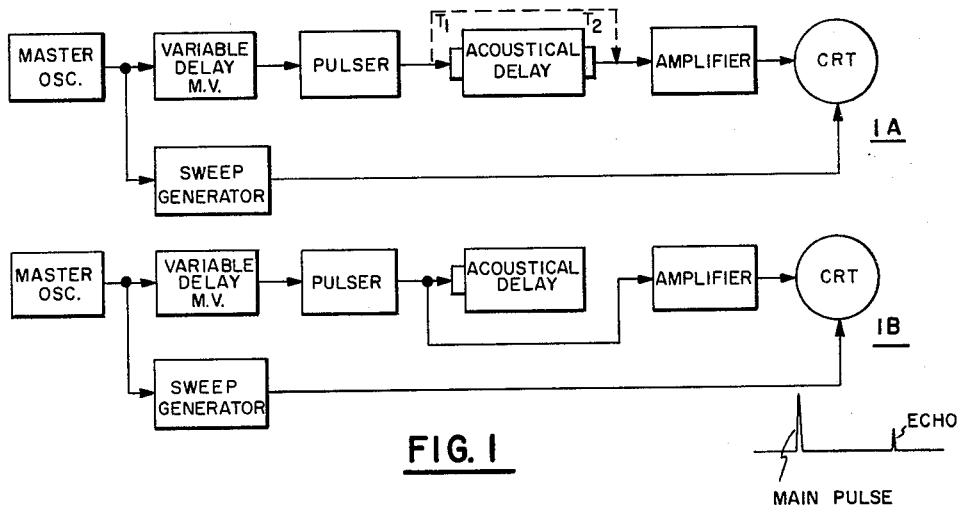
FIG. I
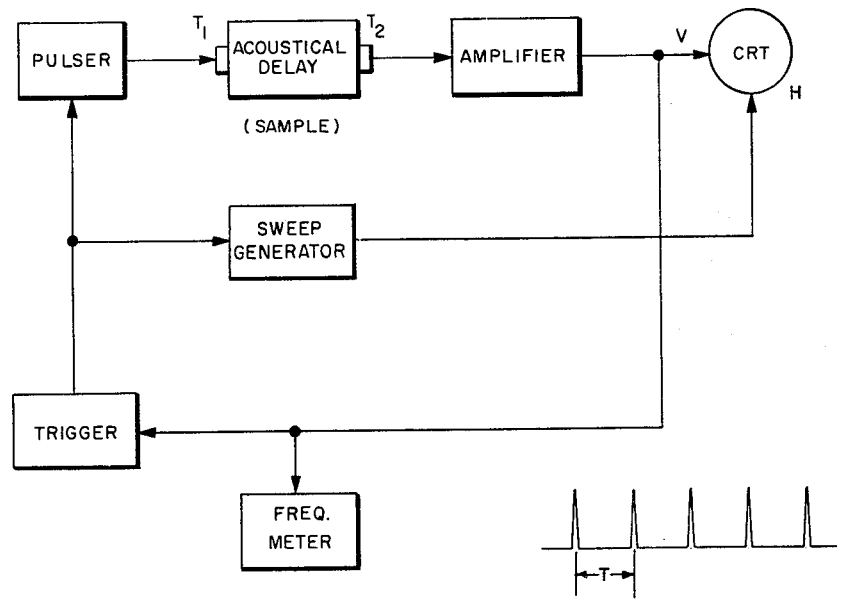
FIG. 2
INVENTORS
RUSSEL L. UPHOFF
DONALD P. RELYEA
BY
ATTORNEY Oct. 27, 1964    R. L. UPHOFF ETAL    3,153,928
ULTRASONIC MEASUREMENT INSTRUMENT
Filed June 22, 1962    2 Sheets-Sheet 2

INVENTORS
RUSSEL L. UPHOFF
DONALD P. RELYEA
BY
*Robert Ames Norton*
ATTORNEY

United States Patent Office 3,153,928
Patented Oct. 27, 1964

3,153,928
ULTRASONIC MEASUREMENT INSTRUMENT
Russel L. Uphoff, Stamford, and Donald P. Relyea, South Norwalk, Conn., assignors to Branson Instruments, Inc., Stamford, Conn., a corporation of Connecticut
Filed June 22, 1962, Ser. No. 204,485
5 Claims. (Cl. 73—67.8)

This invention relates to sonic and especially ultrasonic devices for measuring thickness or locating faults in material.

Ultrasonic methods have been used extensively for the measurement of thickness of walls of vessels such as tanks and the like, and also for the detection and precise location of faults, particularly in metal products. Also sound velocity measurements are useful in determining the composition of products such as butter fat in milk, strength of concrete, etc. Essentially the two measurements are doing the same thing, that is to say they are measuring the time which it takes for the ultrasonic vibrations to move a certain distance in the material in question. In the case of measuring thickness this is the path from one side of the material to the other, and in the case of a fault it is the path length to the fault. In this latter case the fault, which represents a sharp acoustical discontinuity of materials, produces an echo, and of course the time for the echo to come back to the original surface where the ultrasonic transducer has applied ultrasonic vibrations represents twice the distance of the fault from this surface.

In the case of thickness measurements it is possible to use a second transducer on the other side of the material, and then the time is directly proportional to the thickness of the material. However, many thickness measurements involve echo techniques. For example, it is often desirable to measure the thickness of the wall of a container or other structure where it is not feasible to apply transducers to both sides of the material. For example, it is possible to examine the plates of a ship hull from the outside, or to determine the thickness of walls of a large tank also from one side. In this case, of course, the echo is from the discontinuity resulting from the interface between the opposite side and the air or other material with which it is in contact. Of course, when the measurement is all from one side the time for the echo to reach the side where ultrasonic vibrations are being impressed represents twice the thickness of material exactly as in the case of flaw detection. The two procedures, however, operate in the same manner, and it is only a question of suitable calibration of the device for echo or for straight through transmission. It is somewhat simpler to illustrate a measurement of thickness with transducers on both sides of the material, and this modification will be used in illustrating the invention. It should be understood, however, that precisely the same operation results when the transducers are both on one side or when a single transducer is used both for applying pulses and for receiving the echo.

In the past two general methods have been used for ultrasonic measurement. In the first method, pulses of energy at ultrasonic frequency are applied through a transducer to a wall of the material to be measured. The energy is in the nature of a burst and involves a number of ultrasonic vibrations. When the echo is received it will normally be much weaker than the original pulse. It is customary in this type of instrument to display both the original pulse and the echo on a cathode ray tube. The distance between pulse and echo is, of course, a measure of twice the path length. If the second transducer is on the opposite side of the wall to be measured, of course the time interval represents the actual thickness.

The simple instrument described above has been used extensively, and in fact is almost standard for general purpose investigation of faults and measurements of thickness. It has, however, serious disadvantages which have materially reduced its effectiveness and limited the field of accurate use. The first disadvantage is that if a cathode ray tube is used as a display the horizontal sweep must be highly linear because the measurement of the path length between original pulse and echo is a linear measurement on the cathode ray tube face, and any non-linear sweep would adversely affect the accuracy. Also, it should be realized that it is difficult to measure with extreme precision the distance between two pulses on a cathode ray tube face even with a perfectly linear sweep and a good graticule on the face of the tube. For one thing the parallax error still remains. As a result the instrument has been useful only where the moderate accuracy which is possible is sufficient for the measurements desired. Another problem arises if the echo is not sharp. This is usually an advantage, in that the shape of the echo pulse can give considerable information with respect to the nature of a fault.

In order to improve the accuracy of measurement a different type of instrument has been proposed. In this instrument the echo serves to trigger the pulse generator. The distance between the pulses is now transformed into a frequency of recurrence of the pulses, and this frequency can be measured with extreme precision by conventional electronic instruments. The accuracy is, therefore, very much higher than is possible with the first device. Since the echo triggers the pulse generator this system is sometimes popularly known as "the sing around" system.

The sing around system has serious disadvantages. The echo is never seen at all because it is merely represented by another initial pulse and therefore the shape of the echo pulse which tells a great deal about the nature of the discontinuity is completely lost. This is especially serious in the investigation of faults in materials where the nature of the echo gives much valuable information. Another serious disadvantage of the sing around system is that it is necessary to have a very good signal to noise ratio. Otherwise the system becomes unstable and inaccurate for if the threshold of triggering is kept low enough to be actuated by very faint pulses it may be so low that the noise in the system triggers it off, giving false results. On the other hand, if the triggering threshold is maintained too high then echos of low intensity may be lost, and again the operation becomes unstable. Multiple echos which have traversed the path several times tend to become dispersed in time and present a similar problem. Other modes of propagation in solids such as shear waves can also interfere.

The present invention retains all of the advantages of both systems without any of their disadvantages except that it cannot be made completely automatic as readily as the sing around system, but as cathode ray tube display is standard this is not a serious problem. Essentially the present invention depends on the use of a variable oscillator from which is derived the main pulse and a distinctive marker pulse which can then be moved across the face of a cathode ray tube until it coincides sharply with the echo pulse. The frequency of the marker oscillator is measured and so the same accuracy is obtainable as with the sing around system. At the same time, however, all of the advantages of pulse shape information are retained, the cathode ray tube sweep need not be linear because frequency is being used as an inverse measure of path length and not physical distance on the cathode ray tube face, and it is also possible to use the instrument under conditions of poor signal to noise ratio where the sing around system would be completely unusable.

The invention will be described in greater detail in conjunction with the drawings in which:

FIG. 1A and B are block diagrams of the ordinary pulse echo instrument of the prior art;

FIG. 2 is a similar block diagram of the sing around system;

Figure 3:
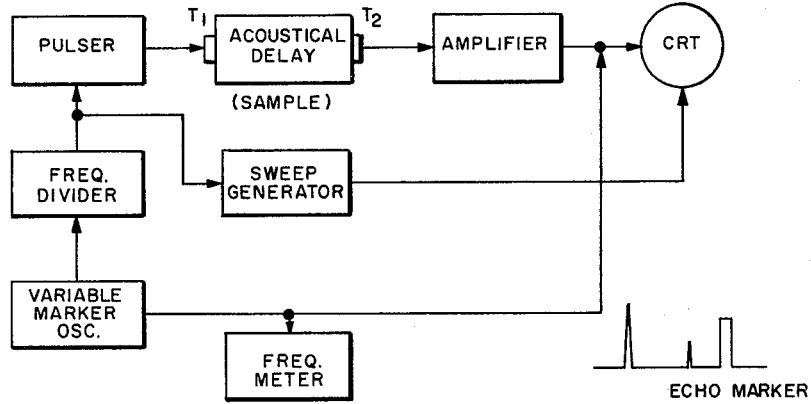
FIG. 3 is a block diagram of one modification of the present invention.

FIG. 1 and 2, which illustrate the prior art instruments, are necessary to make clear the differences of the present invention. FIG. 1 shows two standard types of instrument. In FIG. 1A there is the instrument in which a separate transducer is used for measuring the thickness of a wall. The two transducers are shown at T1 and T2, and the material to be measured is labeled as the acoustic delay. FIG. 1B shows the single transducer modification, which is especially useful for locating faults, or for measuring the thickness of a wall from one side only. As the two modifications with one or two transducers are completely equivalent in their operation the other figures of the drawing show the two transducer modification, but it should be understood of course, that the single transducer modification can be used. In FIGS. 1A and B there is a master oscillator which starts the horizontal sweep of the cathode ray tube. After a variable delay, which may be effected by a conventional multivibrator as appears from the legend on the block, a pulse generator is triggered to produce a pulse. Transducer T1 receives the generated pulse, transforms it into ultrasonic vibrations, and T2 receives the ultrasonic vibrations at the other side of the material to be measured after a delay which is proportional to the thickness. There is an electrical pick-up from the main pulse, shown as a dashed line between the two transducers so that the main pulse also appears on the cathode ray tube after passing through the amplifier. In FIG. 1B the same thing occurs, but here there is a single transducer applied to one side of the material to be tested.

At the lower right hand corner of the figure there appears, in idealized form, the representation on the cathode ray tube face. There is a main pulse, which is quite strong, and after a certain distance the much smaller echo pulse. The pulse forms are idealized as in practice, of course, there is a slower die-out and the shape of the echo particularly will normally not be an idealized pulse. In fact the shape and amplitude of the echo is a very important factor in judging the nature of the fault as has been referred to above. It will be noted that the measurement is a length measurement on the cathode ray tube face between the two pulses. This can only be moderately accurate even with a cathode ray tube having a perfectly linear horizontal sweep and with parallax reduced to a minimum. Of course, if the sweep is not linear the length is almost meaningless except in a very approximate way, and this severely limits the use of the instrument even with the most perfect cathode ray tubes available. Nevertheless the instrument shown in FIGS. 1A and B is used commonly in industry, and has performed useful functions even though its accuracy of time measurement is comparatively low.

FIG. 2 shows the sing around system. Here the echo from transducer T2, after amplification is fed back to a trigger circuit, which in turn retriggers the pulse generator. The operation is self-evident from a consideration of the block diagram. The signal which appears on the cathode ray tube is shown again below and at the right of the figure. All of the pulses are of uniform height, they are strong, and the interval between the pulses is measured by the frequency of the pulse repetition rate. This in turn is measured by a conventional frequency meter as indicated on the drawing, and can be measured with extreme precision, measurement of frequency to a few parts in a million being a simple electronic achievement. As in the case of FIG. 1, the form of the pulses appearing on the cathode ray tube are highly idealized. In practice it is difficult to obtain this degree of accuracy because the ultrasonic energy does not die out between pulses and there is a serious risk of spurious triggering where the signal to noise ratio is not of the best. If the level of the trigger circuit is placed sufficiently high so that no spurious signals arise the sensitivity of the instrument suffers.

FIG. 3 illustrates one modification of the present invention. The blocks on the block diagram are labeled and the two transducers are shown at T1 and T2 as in FIGS. 1 and 2 and, as pointed out above, of course a single transducer may be used in a configuration similar to that of FIG. 1B. The pulse generator impresses a pulse on transducer T1, which passes through the material to be measured, producing an echo from T2 which is amplified and applied to the cathode ray tube. So far this does not differ from FIG. 2. Now, however, the circuit differs. A variable frequency marker oscillator of conventional design feeds into the input of the cathode ray tube. A portion of the output of the variable marker oscillator passes into a conventional frequency divider the output of which triggers the pulse generator. As a result the pulses are always synchronized with a marker. The present invention is not concerned with any particular degree of frequency division, but it has been found that divisions to one-sixteenth to one-sixty-fourth of marker frequency give very satisfactry results. The purpose of the frequency divider is to have a much smaller number of pulses than corresponds to the marker itself. This permits acoustical energy to die out completely between pulses, thus eliminating interference therefrom. It might be wondered why this is so necessary, but a moment's consideration will make it clear that there can be multiple echoes. For example the echo from the other face of the material being measured or from a fault comes back to the first face, is echoed back and so on. If the next pulse occurs within the time when these multiple echoes are still evident residual echoes can be confused with the desired one. By reducing the frequency of the main pulse it can be assured that these multiple echoes will have completely died out and there will only be one clean echo shown on the cathode ray tube.

In operation the instrument of FIG. 3 will first produce a display on the cathode ray tube such as is shown below and to the right. The marker will ordinarily not coincide with the echo. In this case it is shown displaced some distance to the right. The marker generator frequency is then gradually adjusted until the marker frequency is such that the edge of the marker exactly coincides with the edge of the echo pulse. This can be done with extreme accuracy and then the path length is measured by the frequency of the marker generator in a manner similar to that used in the sing around system shown in FIG. 2. The accuracy is just as high. This is of vital importance when the instrument is used to measure sound velocities.

The pulse is visible at all times. Its nature can be examined and, in the case of fault detection particularly, much information can be obtained from an examination of its shape. Also in the case of measurement of tanks from one side only, or the hulls of ships, using of course a single transducer in the connection shown in FIG. 1B, it is possible to learn something about the inner surface which is of importance, and the information is not limited only to a determination of the actual thickness. For example, if extensive rusting has taken place at a particular point on the inside of the container or the inside of a ship hull, the echo will not be quite the same as if it comes off a smooth metal surface in contact with air. Sometimes this is also of importance as it makes it possible to learn more about the nature of the inner surface.

The study of the display on the cathode ray tube is completely controlled by the operator. He can view the echo to determine its shape for as long as is necessary and then bring the marker generator to coincidence, reading off the distance on the frequency meter which, of course, can have its indicator calibrated in distance. Since the measurement is a frequency measurement extreme linearity of the cathode ray tube sweep generator is of no importance and this permits using less complex cathode ray tube circuits and is an additional cost saving.

Figure 4:
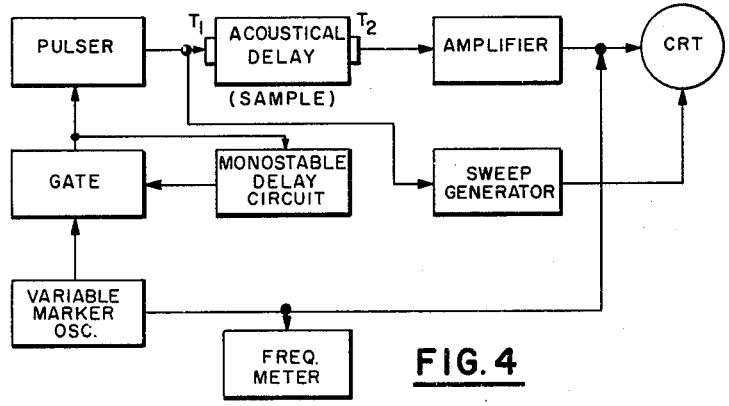
FIG. 4 is a block diagram of a different modification of the present invention.

FIG. 4 represents a somewhat different type of pulse control. A particular pulse from the variable frequency marker oscillator triggers the initial pulse from the pulse generator and simultaneously activates a monostable delay circuit of which a gate element is an integral part. Subsequent pulses from the marker oscillator will have no effect on the pulse generator, the monostable gate circuit, or the sweep circuits until the completion of the delay function at which time the next marker generator pulse will cause the process to be repeated. Thus, markers, pulse generator and sweep circuits are all synchronized yielding a stable oscillograph display showing main pulse, echo and markers. Alternately the delay function can also be initiated from the output of the pulser. The maximum pulse repetition rate is determined by the constants of the monostable delay circuit. As will be shown the circuit acts as a true frequency divider. It saves components wherever moderately high frequency division is required over what is needed in FIG. 3. The monostable delay circuit can be adjusted to any value from a 1:1 correlation with the marker oscillator to a repetition rate which will correspond to an extremely high division of a marker generator pulse frequency when the pulse has been aligned with the echo.

It will be clear that FIG. 4 presents exactly the same advantages as FIG. 3 but includes the further advantage of component saving.

All of the circuits shown in FIGS. 3 and 4 with the exception of the monostable delay circuit and gate are conventional electronic circuits, and therefore have not been further described.

Figure 5:
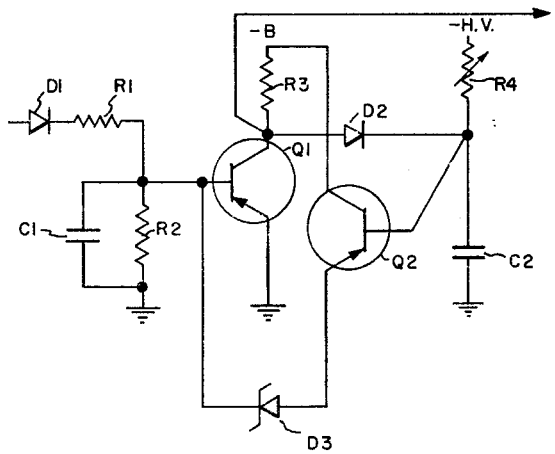
FIG. 5 is a schematic of a portion of FIG. 4.

The gate and the delay circuits shown in FIG. 5 consist of two transistors Q1 and Q2, with two ordinary diodes D1 and D2, and the Zener diode D3. There are also included resistors R1, R2, in the input circuit to Q1, and collector resistor R3, and variable resistor R4. Capacitor C1 shunts resistor R2 in the input circuit of Q1, and the capacitor C2 in conjunction with the variable resistor R4 determines the delay characteristics of the delay circuit.

It will be noted that Q1, Q2 constitute, when taken together, a monostable multivibrator circuit. When considered separately, Q1 acts as a gate, R4, C2, Q2 and D3 serve as a time determining circuit which dictates the duration of gate closure. Q1 is a specialized PNP transistor which is normally stable either in the conducting or nonconducting state, and can be triggered from either state to the alternate state by suitable trigger pulses. As used in the circuit herein described, Q1 is normally stable, which is to say that the whole circuit is stable when Q1 is in the conducting state. The collector voltage shown at B minus is chosen at about 20 volts minus. The high voltage marked minus HV is considerably higher for example −200 volts. Its exact value depends on the delay time desired as is also the case with resistor R4 and capacitor C2. The collector of Q1 is very near 0 volt. As D2 is forward biased by −HV it conducts and the junction of R4 and C2 is also held at about 0 volt. Q2 is thus not conducting because D3 is below breakdown voltage.

The action of the gate and delay circuit is as follows: Consider the application of a single positive trigger pulse at the base of Q1. Q1 is instantaneously switched to cut off which brings the junction of R3, D2 to B minus. Because of the switching of Q1 and the rising of the collector potential to B minus, D2 ceases to conduct, allowing the potential at the junction of R4, C2 to rise exponentially towards minus HV. Q2 whose base is connected to the junction of R4, C2 immediately begins to conduct and the gradually rising potential on the base of Q2 is transferred to the emitter of Q2. The voltage continues to rise until the avalanche voltage of the Zener diode D3 is reached, at which time a negative turn-on pulse is applied to the base of Q1 instantly returning it to its stable, normally conducting state. The delay function is at this point terminated by the intantaneous return of the collector potential of Q1 to near zero volts thereby causing D2 to conduct heavily which forces the junction of R4, C2 also to near zero volts. This completes one cycle.

It is obvious that regardless of the frequency of input trigger pulses no pulses will be passed through the gate during the cut off condition of Q1. Once the stable state has been reached, the next subsequent positive input trigger pulse repeats the cycle. A negative output trigger will be transmitted from the collector of Q1 to the pulser.

It should be noted that the pulse repetition rate of the main pulser is chosen by the operator and is not determined by the echo pulse, as in the sing around system. Extreme accuracy with full pulse observation for the shape of the echo pulse is possible and even with a signal to noise ratio which would be completely impossible for the sing around circuit of FIG. 2 the invention operates satisfactorily. It will be noted that the combination of the advantages of the prior systems is obtained with very little additional circuitry and maximum precision and reliability always results.

A cathode ray tube has been shown as a display device, but of course other readout instruments can be used where the pulse shape is not of primary importance. The invention is therefore not limited to the use of a cathode ray tube although for most instruments such a readout device is advantageous and is preferred. FIG. 5 illustrates one practical gate and delay circuit. The invention is not limited thereto, other circuits performing the desired functions may be substituted.

The present invention operates with vibrations either at audible or ultrasonic frequency. The vibrations are in the form of compressional waves which are currently referred to as acoustic waves. The broad use of the term will be employed in the claims regardless of whether the frequency of the waves is in the audible range or above it.

We claim:

1. In an acoustic measuring instrument comprising a pulse generator for generating energizing pulses of frequency in the sonic to ultrasonic range, at least one electroacoustic transducer responsive to said energizing pulses for introducing vibrational waves in said range into a sound transmitting material and for detecting echoes arising from acoustical discontinuities in said material, and a readout element connected to said transducer for responding to both said energizing pulses and said echoes, the improvement which comprises,
   (a) a variable frequency marker oscillator producing spaced marker pulses and means for connecting the output of the oscillator to the readout element,
   (b) the readout element displaying the pulses on a time base whereby the period between said marker pulses of the marker oscillator may be made equal to, or a known function of the time between one of said energizing pulses and an echo corresponding thereto,
   (c) means actuated by the marker oscillator for synchronizing the pulse generator at a submultiple frequency of said marker oscillator, and
   (d) means for measuring the frequency of the marker oscillator.

2. An instrument according to claim 1 in which the readout element is a cathode ray tube with a horizontal sweep synchronized with the pulse generator, the vertical input to the cathode ray tube being connected to the marker oscillator and said transducer for displaying said energizing pulses, said echoes and said marker pulses.

3. An instrument according to claim 2 in which the actuating means from the marker oscillator to actuate said pulse generator means is a frequency divider.

4. An instrument according to claim 2 in which the actuating means for synchronizing the pulse generator comprises a delay circuit and gate, the gate being connected between the marker oscillator output and the pulse generator input, the gate when open being capable of passing a trigger pulse to the pulse generator and the gate and delay circuit being capable of responding to said trigger pulse to close the gate and to reopen it on the expiration of the delay circuit time delay.

5. An ultrasonic inspection apparatus comprising, in combination,
   (a) ultrasonic transducer means mechanically coupled to a test body for generating ultrasonic energy in said test body and detecting ultrasonic echoes propagated in said test body,
   (b) a cathode ray tube electrically connected to said transducer for visually displaying the electrical response of said transducer means to the detection of ultrasonic echoes propagated in said test body,
   (c) a marker oscillator generating time spaced marker pulses for visual display on said cathode ray tube and for determining the time relation between the generation of ultrasonic energy by said transducer means and ultrasonic echoes detected by said transducer means,
   (d) a gate having
       (1) a first input comprised of said time spaced marker pulses from said marker oscillator
       (2) a second input for enabling said gate at a frequency rate less than the frequency rate of said marker pulses and
       (3) an output having a frequency rate corresponding to the enabling rate of said gate
   (e) a pulser responsive to said output from said gate for pulsing said transducer means so as to generate ultrasonic energy in said test body and
   (f) a sweep generator synchronized to said output from said gate for controlling said cathode ray tube to display said echoes in time spaced relationship to the generation of ultrasonic energy in said test body by said transducer means.

References Cited in the file of this patent
UNITED STATES PATENTS

| | | |
|---|---|---|
| 2,741,742 | Moore | Apr. 10, 1956 |
| 2,889,705 | Hanysz et al. | June 9, 1959 |